March 3, 1931.  F. C. FREEMAN  1,795,020
METER PIPE SUPPORTING CLAMP
Filed June 12, 1929
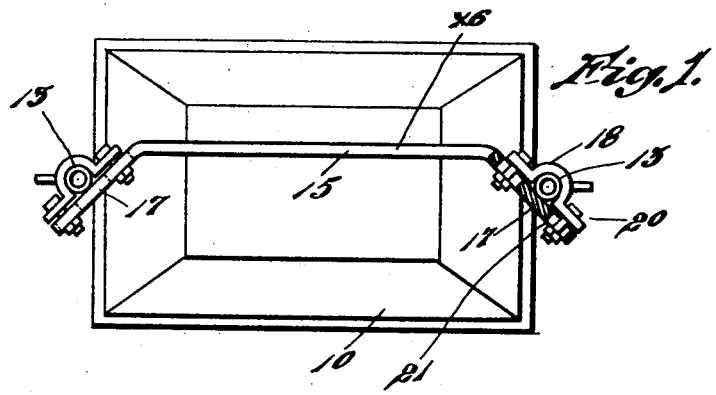
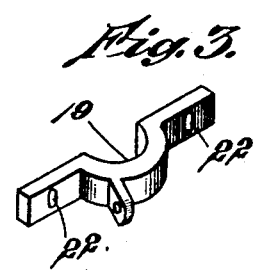
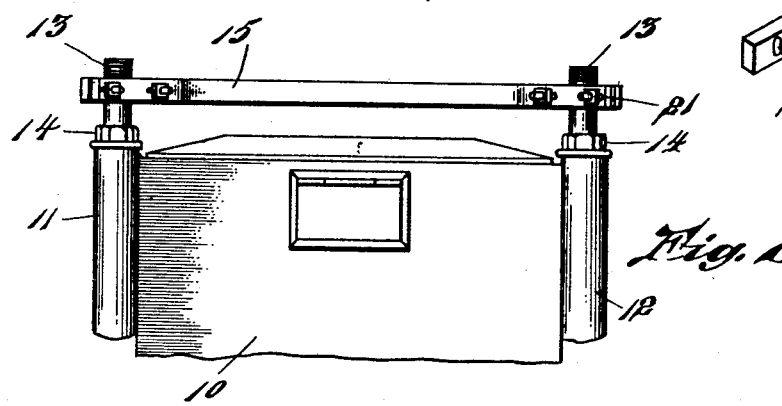
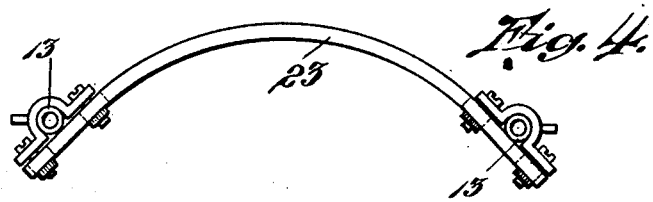
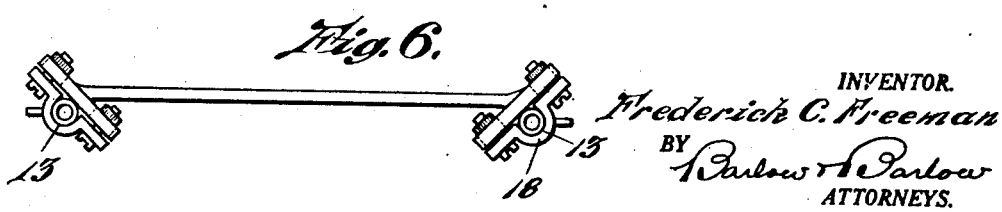
INVENTOR.
Frederick C. Freeman
BY Barlow & Barlow
ATTORNEYS.

Patented Mar. 3, 1931

1,795,020

UNITED STATES PATENT OFFICE

FREDERICK C. FREEMAN, OF PROVIDENCE, RHODE ISLAND

METER-PIPE-SUPPORTING CLAMP

Application filed June 12, 1929. Serial No. 370,417.

This invention relates to an improved construction of clamp for supporting gas meter pipes or connections; and has for its object to provide a clamp device of this character having a cross bar with offset end portions to engage the inlet and outlet meter pipes to retain them in position or to support them against excessive strains.

A further object of the invention is to provide a clamp bar of a length to extend across the meter tank and to set one or both of the ends of the bar on an angle to the axis of the bar and to provide a clamp member which is mounted to cooperate with the bar ends to bind the meter pipes thereto.

The invention further consists in the provision of means in the clamping ends of the bar whereby the clamp may be adjusted to accommodate meter pipes which are out of alignment with each other.

With these and other objects in view, the invention consists of certain novel features of construction, as will be more fully described, and particularly pointed out in the appended claims.

In the accompanying drawings:

Fig. 1 is a view showing a clamp bar of my improved construction wherein the ends of the cross bar are offset or inclined to the axis of the bar to lie against the inlet and outlet meter pipe connections.

Fig. 2 is an elevation showing the clamp bar as built to the inlet and outlet meter pipes.

Fig. 3 is a perspective view of the clamp member.

Fig. 4 is a modification illustrating the cross bar as disposed on the arc of a circle.

Fig. 5 is another modification showing the cross bar with its ends offset on substantially the same inclination to the axis of the cross bar.

Fig. 6 shows still another modification in which the cross bar has two T-shaped oppositely inclined end portions.

It is found in practice that the usual gas meter is built of tin and is provided with inlet and outlet tubings vertically disposed and soldered to its side walls. At the upper ends of each of these tubes is mounted a so-called swivel union, which includes a union member and a short length of piping to one of which the service pipe is connected, while the other is connected to the piping system thru which the user is supplied.

Oftentimes these inlet and outlet pipes are out of alignment with each other; also these pipes are often subjected to considerable strain in the setting of the meter to bring the pipe connections into proper position; also the shut off valve after standing for a considerable length of time becomes frozen requiring considerable force to move it, which force also has a tendency to rupture the tubing, if unsupported; and in order to support these pipes against rupture, I have provided a rigid clamp bar which extends across the meter body and is connected to both the inlet and outlet pipes of the meter, preferably the so-called swivel connections adjacent the body of the meter to firmly support the same at this point against possibility of rupture and from excessive strains being brought to bear upon the same; and the following is a detailed description of the present embodiment of my invention and showing the preferred form with views of the many modifications by which these advantageous results may be accomplished:

With reference to the drawings, 10 designates the tank or body portion of the meter to one side of which is secured the inlet tubing 11 and to the opposite side of which is secured the outlet pipe or tubing 12, each of which is ordinarily connected in substantially vertical position to extend along the side walls of the meter tank.

At the upper end of these tubes 11 and 12, I preferably connect a short length of pipe 13 thru a union 14, which pipes with their unions are known in the trade as swivel pipe connections and to these swivel pipes 13 I preferably apply a clamp bar 15, as presently described, for the purpose of firmly connecting these pipes together and rigidly support them against excessive strains which may be brought to bear upon the same, upon making or breaking the pipe connections during removal of a used meter or the installing of a fresh one.

My improved clamp bar 15 is provided with a body portion 16 of a length to extend across the top of the meter tank with its opposite end portions 17 disposed in a plane at an incline to that of the body of the bar and arranged to engage the inner surfaces of the opposite pipes 13.

A yoke-shaped clamp member 18 is provided with a recess 19 to fit the pipe and bolts 20 are passed thru this cap to bind the pipe to the ends of the bar.

In some instances, I slot the bolt holes in the bar longitudinally as at 21 for a relative endways adjustment of the cap and I also slot the bolt holes 22 in the cap vertically to cooperate with slots 21 to permit a universal adjustment of the cap relative to the bar to accommodate the pipes when out of alignment with each other in any direction.

In some instances, instead of disposing the body of the bar to extend straight across the top of the tank I may form this bar on the arc of a circle, as illustrated at 23, in Fig. 4, to the ends of which the clamping caps may be secured, or as illustrated in Fig. 5, the end portions 28 of the bar 29 may be set on an incline in planes parallel with each other or as illustrated in Fig. 6, the ends of the bar may be in somewhat of a T-shape with the cross bars set at an angle to the axis of the bar and in planes which are not parallel with each other.

The broad object of the invention is to provide a rigid support for the inlet and outlet meter pipes and to so dispose the ends of the cross bar relative to each other with the caps or pipe clamping members as to permit a universal adjustment of these clamping caps or members at the ends thereof to accommodate meter pipes which may be out of alignment with each other in any direction.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. Means for connecting inlet and outlet pipes of a meter tank comprising a brace portion made of stock bar metal with its ends bent at an angle to the body part, a pair of similar pipe clamping portions also made of bar stock and each having a pipe receiving recess, and means to detachably and adjustably secure said clamping portions to the ends of the brace portion.

2. Means for connecting inlet and outlet pipes of a meter tank comprising a brace portion made of stock bar metal with flat pipe engaging portions at an angle to the body part, a pair of similar pipe clamping portions also made of bar stock and each having a pipe receiving recess, and means to detachably and adjustably secure said clamping portions to the ends of the brace portion with the flat pipe engaging portions in contact with the pipes, whereby said brace portion is readily mounted by merely positioning the brace between the pipes and locking the clamping portion of the flat pipe engaging portions.

In testimony whereof I affix my signature.

FREDERICK C. FREEMAN.